(12) United States Patent
McKenney et al.

(10) Patent No.: US 7,748,003 B2
(45) Date of Patent: Jun. 29, 2010

(54) HARD REAL-TIME RESPONSE

(75) Inventors: Paul E. McKenney, Beaverton, OR (US); Dipankar Sarma, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 1590 days.

(21) Appl. No.: 11/017,083

(22) Filed: Dec. 20, 2004

(65) Prior Publication Data

US 2006/0150185 A1 Jul. 6, 2006

(51) Int. Cl.
*G06F 9/46* (2006.01)
*G06F 9/30* (2006.01)

(52) U.S. Cl. .................. 718/102; 718/104; 718/105; 718/107; 712/220

(58) Field of Classification Search .................. 712/220; 718/102, 104, 105, 107
See application file for complete search history.

(56) References Cited

U.S. PATENT DOCUMENTS

| 6,085,218 | A | 7/2000 | Carmon | 709/107 |
| 6,110,220 | A | 8/2000 | Dave et al. | 716/3 |
| 6,148,389 | A | 11/2000 | So | 712/35 |
| 6,178,515 | B1 | 1/2001 | Hayashi et al. | 713/300 |
| 6,826,673 | B2 * | 11/2004 | Toyoyama et al. | 712/31 |
| 2001/0054055 | A1 | 12/2001 | Bollella | 709/102 |
| 2002/0078121 | A1 | 6/2002 | Ballantyne | 709/102 |
| 2003/0088606 | A1 | 5/2003 | Miller et al. | 709/102 |
| 2004/0205755 | A1 | 10/2004 | Lescouet et al. | 718/100 |

OTHER PUBLICATIONS

Regehr, "Using Hierachical Scheduling to Support Soft Real-Time Applications in General-Purpose Operating Systems", May 2001, pp. 1-181.*
Brant, "Dynamic Intergrated Scheduling of Hard Real-time, Soft Real-Time and Non-Real-Time Processes", IEEE, 2003, pp. 1-12.*
Suzuki, "A Task Migration Scheme for High Performance Real-Time Cluster System", 2003, pp. 228-231.*
Gerum, RTAI Fusion, Nov. 5, 2003, pp. 1-7, http://www.fdn.fr/~brouchou/rtai/rtai-doc-prj/rtai-fusion-p.html.

* cited by examiner

*Primary Examiner*—Hyung S. Sough
*Assistant Examiner*—Phuong N Hoang
(74) *Attorney, Agent, or Firm*—Lieberman & Brandsdorfer, LLC

(57) ABSTRACT

A general purposed operating system is modified to support hard real-time processing of hard real-time tasks. At least one processing unit in the operating system is designated as a hard real-time processing unit to process hard real-time tasks, and at least one processing unit in the operating system is designated as a non-hard real-time processing unit to process non-hard real-time tasks and designated non-deterministic processing steps. Hard real-time tasks assigned to the non-hard real-time processing unit may be transferred to the hard real-time processing unit, and tasks assigned to the hard real-time processing unit that are about to execute a non-deterministic processing step may be transferred to the non-hard real-time processing unit.

29 Claims, 4 Drawing Sheets

HARD REAL-TIME RESPONSE

BACKGROUND OF THE INVENTION

1. Technical Field

This invention relates to a hard real-time processing unit for processing hard real-time processing steps. More specifically, at least one processor in a multiprocessing system is designated as a hard real-time unit for processing real time processing steps of a task and at least one processor in the system is designated as a non-hard real-time unit for processing non-hard real-time processing steps of a task.

2. Description of the Prior Art

General operating systems may be classified into three general categories associated with completion of a task or processing steps of a task within a predefined time interval. The three general categories are known as hard real-time operating systems, soft real-time operating systems, and non-real-time operating systems. A hard real-time operating system guarantees processes will complete in a defined amount of time. Processing steps in a hard real-time operating system are known as deterministic operations. The terms hard real-time processing steps and deterministic operations are used interchangeably. In hard real-time systems, if a processing step completes correctly but takes longer than its given amount of time, the process fails. A soft real-time system is less restrictive than a hard real-time system. In a soft real-time system, critical processes are given priority over non-critical processes. The boundaries in a soft real-time system are less severe than those in a hard real-time system. For example, in a soft real-time system if a process completes correctly but takes longer than its given amount of time, the result may still be useful. However, in a hard real-time system, if a process completes correctly but takes longer than its given amount of time, the result will not be useful. In a non-hard real-time system, the processing steps are non-deterministic operations and as such are not subject to real-time processing constraints. The terms non-hard real-time processing steps and non-deterministic operations are used interchangeably. In soft real-time, hard real-time, and non-hard real-time systems, a scheduler is utilized to guarantee the amount of time a process requires for execution. The scheduler is part of the kernel in an operating system that initiates and terminates processes and threads. In addition, the scheduler may periodically decide which thread should be run next and switch control to that thread.

There are different real-time operating systems available, many with their own peculiar niche and their own peculiar application program interface. For example, U.S. Patent Publication 2002/0078121 to Ballantyne provides a general purpose operating system in which the entire operating system is treated as a single real-time thread. There is no support for a general purpose operating system in which processors and processes are categorized according to real-time and non-real-time scheduling needs. Rather, real-time scheduling is implemented for non-real-time processes. There is no support in Ballantyne for a single general purpose operating system that supports distinguishing and respecting hard real-time and non-hard real-time processing of appropriately distinguished processing steps. Similarly, U.S. Pat. No. 6,148,389 to So relates to a digital signal processor that runs real-time functions. The digital signal processor is attached to a system running a general purpose operating system. However, the digital signal processor of So has a separate kernel from that of the general purpose operating system. There is no support in So for a single operating system, having one kernel, that can distinguish between hard and soft real-time processes and offload the categorized process to a respectively categorized processor.

SUMMARY OF THE INVENTION

This invention comprises a method and system for attaining real-time processing in a multiprocessing system based upon categorizing processing steps within a task.

In one aspect of the invention, a method is provided for hard real-time services. At least two processing units in a single general purpose shared memory operating system are categorized. One of the processing units is designated at a hard real-time processing unit, and one of the processing units is designated as a non-hard real-time processing unit. During processing of tasks, a task is forwarded from the hard real-time processing unit to the non-hard real-time processing unit if it is determined that the task is about to commence a non-deterministic operation. Upon completion of the non-deterministic operation, the task is returned to the hard real-time processing unit.

In another aspect of the invention, a computer system is provided with at least two processing units in a single general purpose shared-memory operating system. At least one of the processing units is designated within the operating system as a hard real-time processing unit, and at least one of the processing units is designated within said operating system as a non-hard real-time processing unit. A manager is provided to forward a task from the hard real-time processing unit to the non-hard real-time processing unit in response to a determination that the task is about to commence a non-deterministic operation. In addition, the manager returns the task to the hard real-time processing unit upon completion of the non-deterministic operation.

In yet another aspect of the invention, an article is provided with a computer readable signal bearing medium. Means in the medium are provided for categorizing at least two processing units in a single general purpose shared-memory operating system. At least one of the processing units in the operating system is designated in the medium as a hard real-time processing unit, and at least one of the processing units in the operating system is designated in the medium as a non-hard real-time processing unit. Means in the medium are also provided for forwarding a task from the hard real-time processing unit to the non-hard real-time processing unit in response to a determination that the task is about to commence a non-deterministic operation. In addition, the task forwarding means returns the task to the hard real-time processing unit upon completion of the non-deterministic operation.

In a further aspect of the invention, a single general purpose shared-memory operation system is provided with at least two processing units functioning within the system. At least one of the processing units is designated as a hard real-time processing unit, and at least one of the processing units is designated as a non-hard real-time processing unit. A task is provided that may be forwarded from the hard real-time processing unit to the non-hard real-time processing unit in response to a determination that the task is about to commence a non-deterministic operation. Furthermore, the task is adapted to be returned to the hard real-time processing unit upon completion of the non-deterministic operation.

In a yet further aspect of the invention, a computer system is provided with at least two processing units in the system with a single general purpose shared-memory operating system. At least one of the processing units is designated within the operating system as a hard real-time processing unit, and at least one of the processing units is designated within the operating system as a non-hard real-time processing unit. Means are provided for forwarding a task from the hard real-time processing unit to the non-hard real-time processing unit in response to a determination that the task is about to commence a non-deterministic operation. In addition, means are provided for returning the task to the real-time processing unit upon completion of the non-deterministic operation.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

A single general purpose operating system is provided with two or more processing units. At least one of the processing units is designated to execute hard real-time tasks or a deterministic operation within a task, and as such, is known as a hard real-time processing unit. Additionally, at least one of the processing units in the system is designated to execute non-real-time tasks or a non-deterministic operation within the non-real-time task, and as such, is known a non-hard real-time processing unit. The processing units may be either real units or virtual units. For example, software may be implemented in a single processor system to emulate two or more processors, wherein at least one of the two or more processors is a virtual processor and at least one of the virtual or non-virtual processors is designated as a hard real-time processor and at least one of the virtual or non-virtual processors is designated as a non-hard real-time processor. A task executing within the operating system may include one or more processing steps, in which each of the processing steps may be classified into deterministic operation and non-deterministic operation categories. Hard real-time services are provided to the processing units designated as hard real-time processing units by algorithmically isolating the hard real-time processing units from the designated non-hard real-time processing units of the operating system. Accordingly, the processors in a general purpose operating system are classified as hard real-time and non-hard real-time processing units and processing steps are identified as deterministic and non-deterministic operations.

Technical Details

Figure 1:
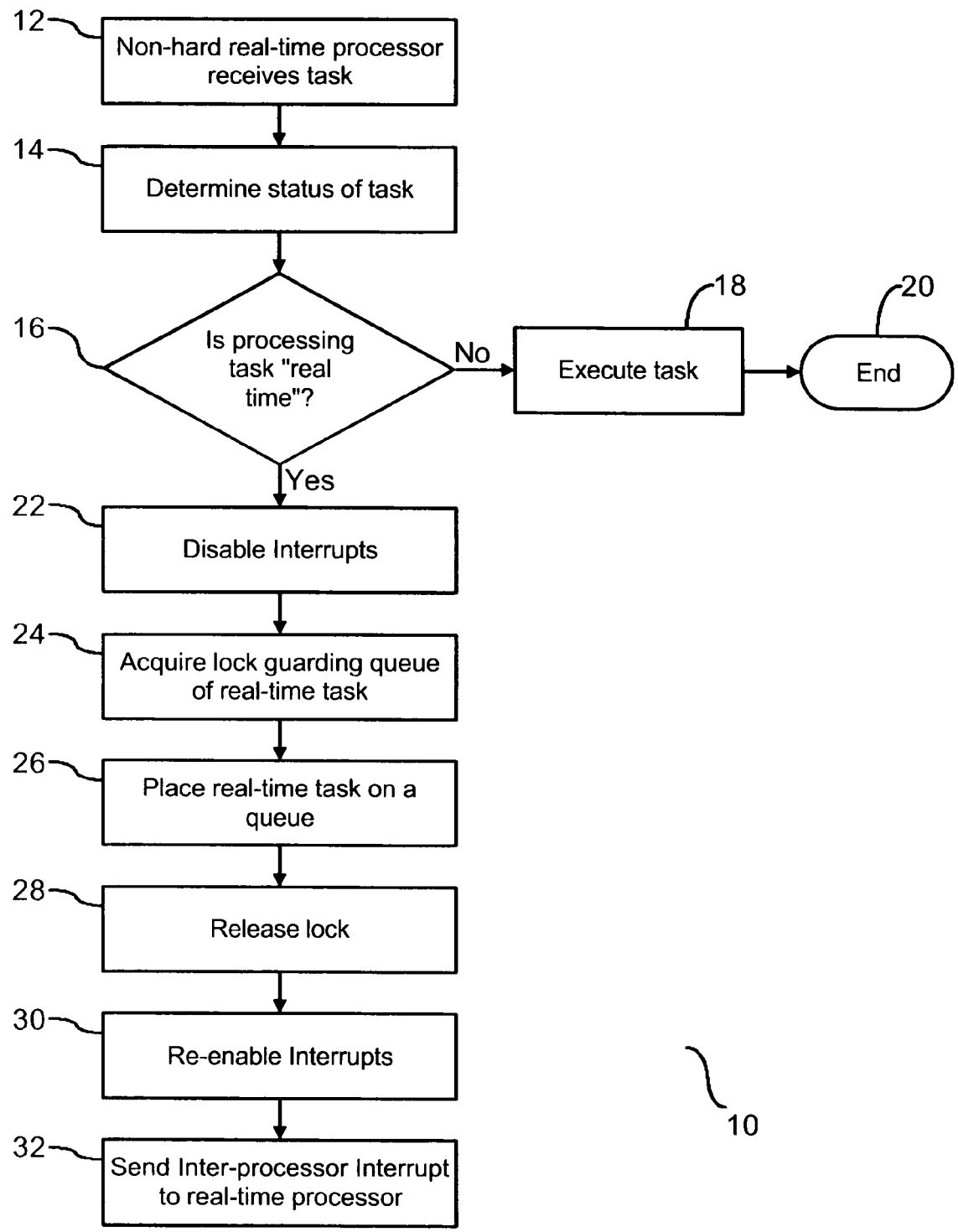
FIG. 1 is a flow chart illustrating a process for transferring a task to a hard real-time processing unit, according to the preferred embodiment of this invention, and is suggested for printing on the first page of the issued patent.

Based upon the classification of processors and processing steps, an algorithm is provided to ensure in a single instance general purpose operating system that, within a real-time task, deterministic operations are executed on a hard real-time designated processor and that non-deterministic operations are executed on a non-hard real-time designated processor. FIG. 1 is a flow chart (10) illustrating a process for transferring a real-time task having one or more processing steps from a non-hard real-time designated processing unit to a hard real-time designated processing unit. Upon receipt of a real-time task by the non-hard real-time designating processing unit (12), a status of the task is determined (14). Thereafter, a test is conducted to determine if the status of the task determined at step (14) is designated as requiring a hard real-time processing unit (16). A negative response to the test at step (16) is an indication that the task may be executed by a non-hard real-time designated processing unit. Thereafter, the task is executed by the non-real-time designated processing unit (18) and the transaction is complete (20). However, if the response to the test at step (16) is positive, all interrupts on the non-hard real-time designated processing unit that received the hard real-time designated task are disabled (22), and a lock guarding a queue of hard real-time tasks is acquired (24). The ascertained hard real-time task is then placed in a queue, i.e. a shared data structure, of both the hard real-time and non-hard real-time processing units (26). The queue is associated with the processor for which it is receiving tasks, and it is shared with all other processors in the system. Once the hard real-time task has been placed in the hard real-time queue, the lock on the queue is released (28) followed by the re-enabling of interrupts (30) and the sending of an interprocessor interrupt to a hard real-time processing unit (32). Accordingly, the first step in providing hard real-time processing is to determine if a task requires hard real-time processing, and to forward such designated tasks to a hard real-time processing unit.

Figure 2:
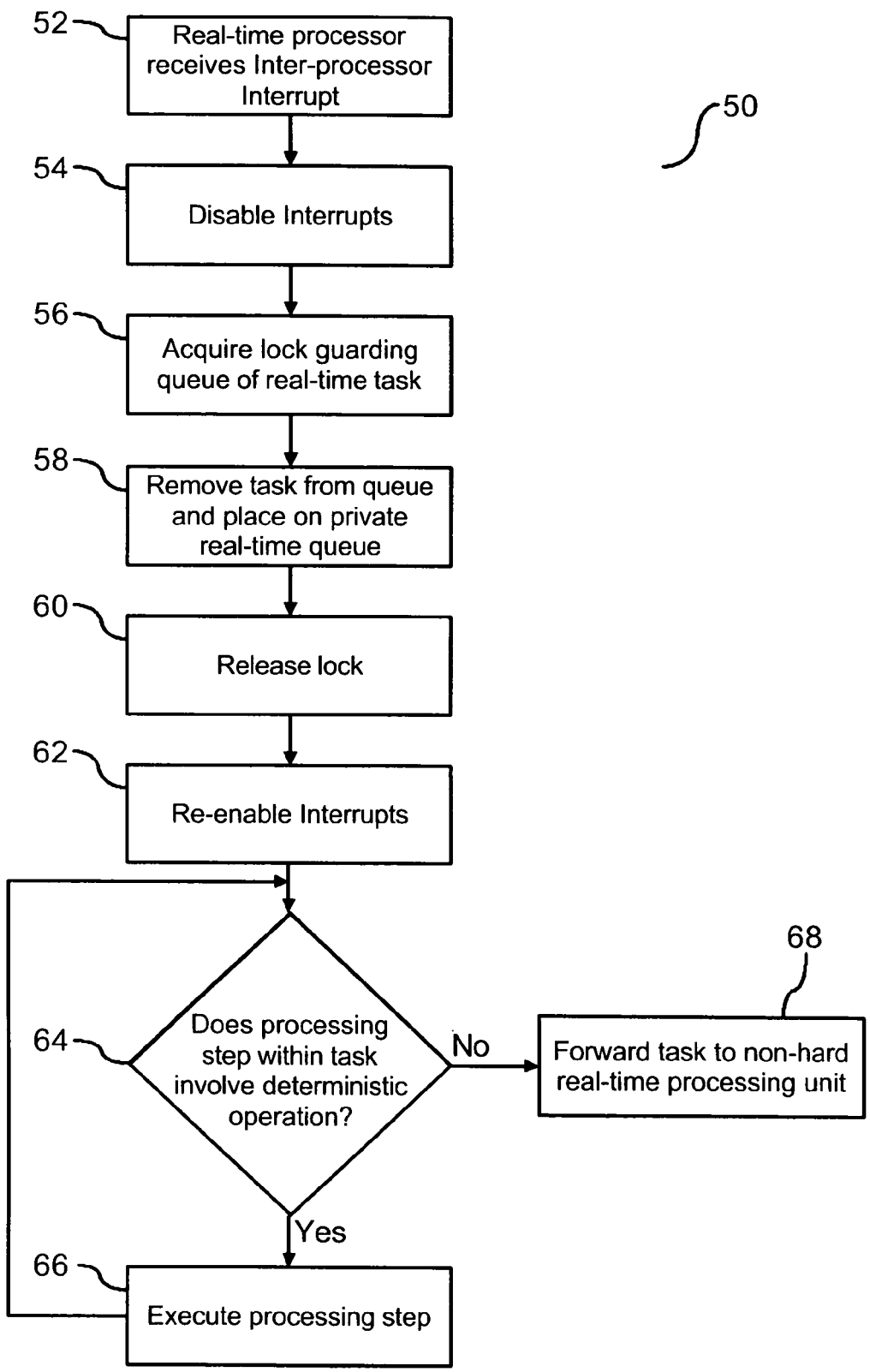
FIG. 2 is a flow chart illustrating a process for receipt of a task by a hard-real-time processing unit.

FIG. 2 is a flow chart (50) illustrating receipt of a hard real-time task by a designated hard real-time processing unit from a non-hard real-time designated processing unit. As shown in FIG. 1, the non-hard real-time processing unit sends an interprocessor interrupt to a designated hard real-time processing unit following placement of the hard real-time task in an appropriate queue. Upon receipt of the interprocessor interrupt from the non-real-time designated processing unit (52), the hard real-time processing unit in receipt of the interprocessor interrupt disables all interrupts (54). Thereafter, a lock is acquired on the queue housing the hard real-time task (56). The designated hard real-time processing unit removes the task from the queue, i.e. the shared data structure, and places the task on a second queue private to the hard real-time designated processing unit (58). The lock on the queue, i.e. shared data structure, is then released (60), and interrupts associated with the hard real-time processing unit in receipt of the hard real-time task are re-enabled (62). Thereafter, a test is conducted to determine if a processing step within a task placed in the private real-time queue at step (58) involves deterministic operations (64), i.e. is safe for hard-real-time execution. The processing step may be in the form of a system call, an interrupt, a trap, an exception, or user mode execution. With the exception of user mode execution, there may be several categories for each of the above noted forms of a processing step with some of the categories being designated as deterministic and some of the categories being designated as non-deterministic. The user mode execution form of a processing step is always categorized as deterministic and designated for execution on a hard real-time processing unit. In one embodiment, an array is provided with one element per system call, with the element indicating whether that system call is deterministic. A negative response to the test at step (64) will result in forwarding the task involving the non-deterministic operation to a non-hard real-time designated processing unit (68). However, a positive response to the test at step (64) will result in execution of the processing step(s) of the task on the hard real-time processor (66). Accordingly, as shown herein, the hard real-time designated processing unit processes hard real-time tasks, but forwards such tasks to non-hard real-time designated processing units when they are about to commence a non-real-time processing step.

Figure 3:
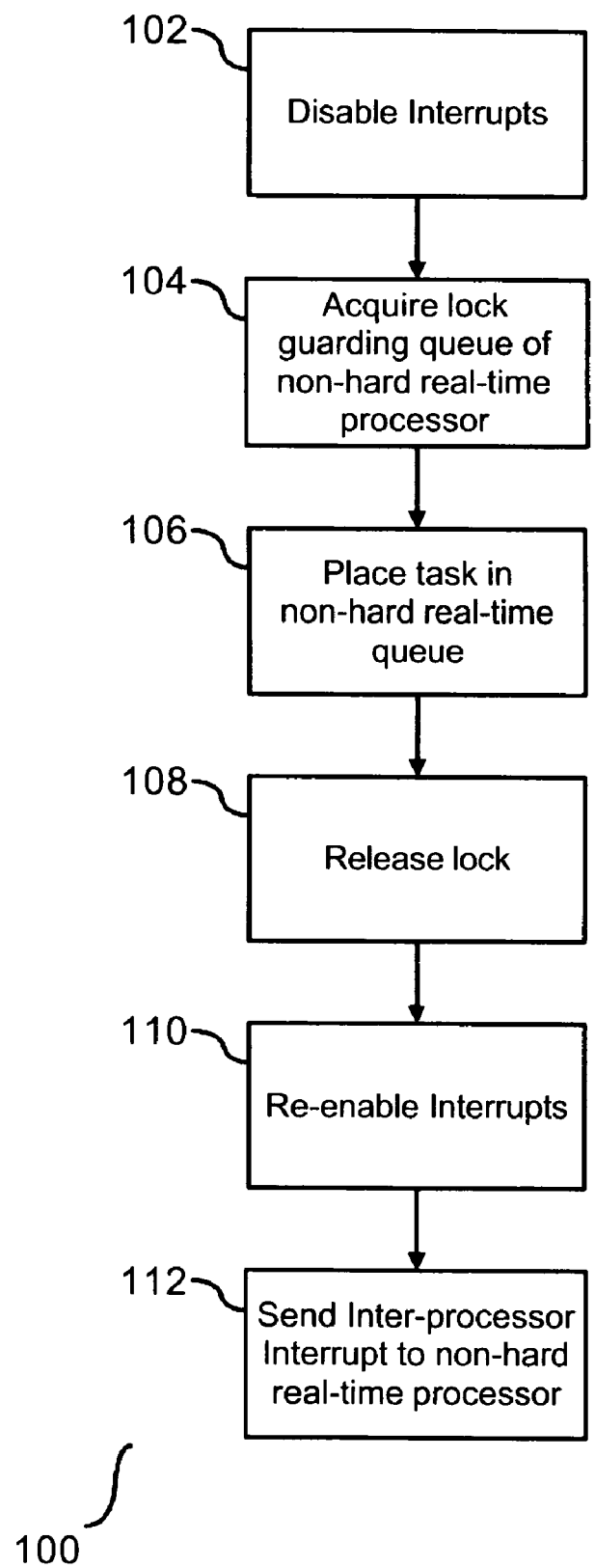
FIG. 3 is a flow chart illustrating a process for transferring a task to a non-hard real-time processing unit.

As shown in FIG. 1, a non-hard real-time processing unit may forward hard-real-time designated tasks to a hard real-time processing unit. Similarly, a non-deterministic operation within a hard-real-time designated task may be forwarded from a hard real-time processing unit to a non-hard real-time processing unit. FIG. 3 is a flow chart (100) illustrating a process for forwarding a designated hard real-time task that is about to commence executing a non-deterministic operation from a hard real-time designated processing unit to a non-hard real-time designated unit. Upon determining that a task involves a non-deterministic operation, the hard real-time processing unit disables all interrupts (102) and acquires a lock guarding a queue, i.e. a shared data structure, of the non-hard real-time processing unit (104). The designated hard-real-time task having the non-deterministic operation is placed in a queue for the non-hard real-time processing unit (106). Once the task is in the queue, the lock is released (108) and interrupts for the hard real-time processing unit are re-enabled (110), followed by the hard real-time processing unit sending an interprocessor interrupt to a non-hard real-time designated processing unit (112). Accordingly, as shown herein designated hard-real-time tasks that are about to execute a non-deterministic operation are forwarded from a hard real-time designated processing unit to a non-hard real-time designated processing unit to maintain the hard real-time status of the hard real-time designated processing unit.

Figure 4:
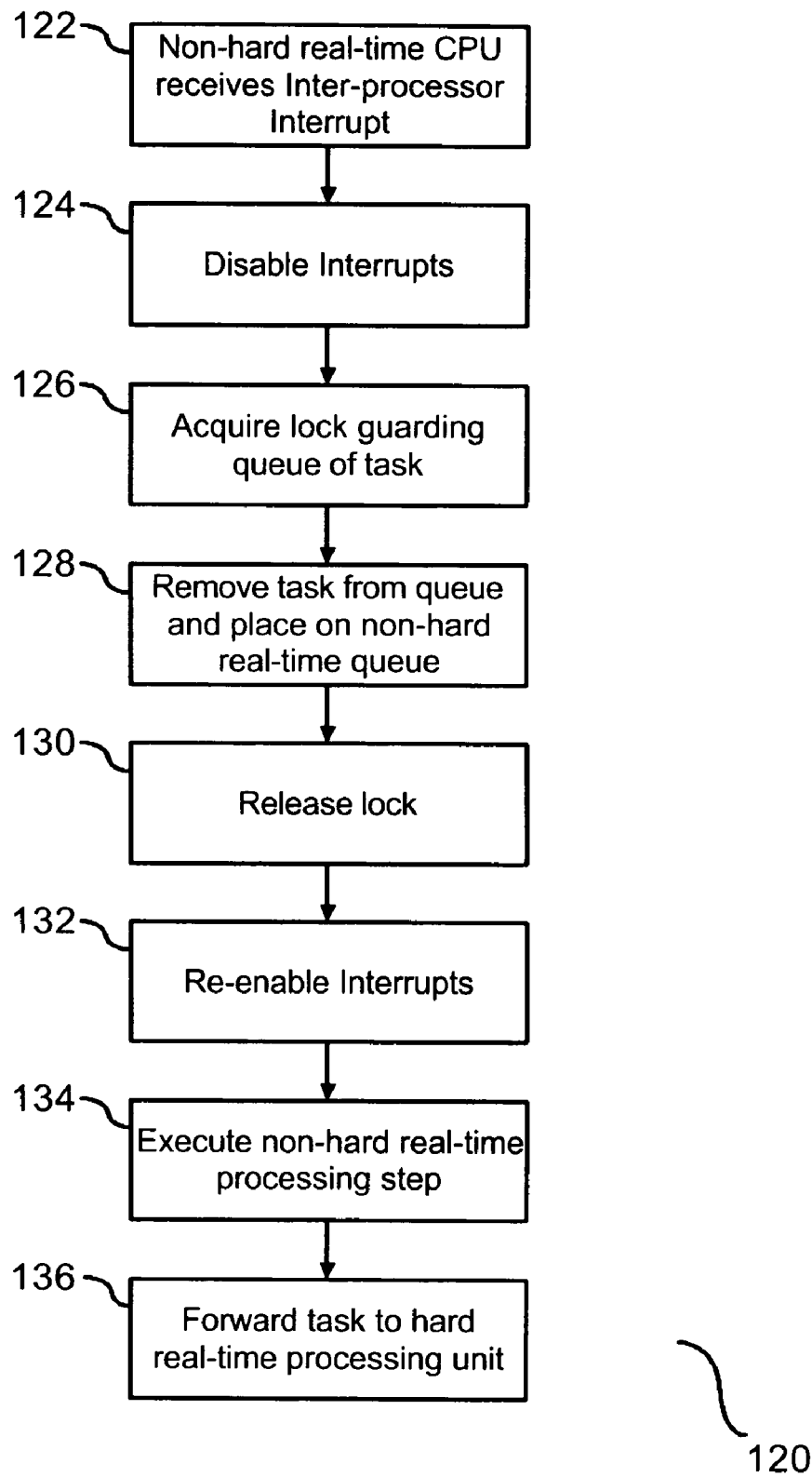
FIG. 4 is a flow chart illustrating a process for receipt of a real-time task by a non-hard real-time processing unit in order to safely execute a non-deterministic operation within that task.

FIG. 4 is a flow chart (120) illustrating receipt of a non-deterministic operation by a designated non-hard real-time processing unit from a hard real-time designated processing unit. As shown in FIG. 3, the hard real-time processing unit sends an interprocessor interrupt to a designated non-hard real-time processing unit following placement of the task in an appropriate queue, i.e. shared data structure. As shown herein, the non-hard real-time designated processing unit receives the interprocessor interrupt from the hard real-time designated processing unit (122). Thereafter, all interrupts are disabled on the non-hard real-time processing unit (124), and a lock is acquired on the queue, i.e. the shared data structure, housing the task (126). The non-hard real-time processing unit then removes the task from the queue and places the task on a queue private to the non-hard real-time designated processing unit (128). The lock on the queue associated with the shared data structure is then released (130), and interrupts on the non-hard real-time processing unit are re-enabled (132). Thereafter, the non-deterministic operation of the designated hard-real-time task is executed on the non-hard real-time designated processing unit (134). After the non-deterministic operation has been executed, the non-hard real-time designated processing unit will proceed with forwarding the task back to a hard real-time designated processing unit (136), as shown in FIG. 1. Accordingly, as shown herein, the non-hard real-time designated processing unit processes non-deterministic operations of real-time tasks received from hard real-time designated processing units, and then returns said tasks to a hard real-time designated processing unit.

As shown herein, non-deterministic operations of a real-time task are executed by a non-hard real-time processing unit, and deterministic operations of the real-time task are executed by a hard real-time processing unit in a system with a single general purpose shared-memory operating system. A task that is about to commence a non-deterministic operation is offloaded from a hard real-time processing unit to a non-hard real-time processing unit with task execution returning to the originating hard-real-time processing unit upon completion of execution of the non-deterministic operation. Although the algorithm shown in FIGS. 1-4 show a general purpose operating system with predesignated hard and non-hard processing units, the algorithm may also be applied to a single instance general purpose operating system not having any predesignated hard real-time processing units, wherein at least one of the processing units in the operating system evolves into a hard real-time processing unit. For example, non-deterministic operation in hard real-time tasks may be offloaded from the processing unit in which they were originally scheduled for execution, and tasks may be designated to execute based upon a scheduling determination. Thereafter, the tasks are marked based upon the scheduling determination and placed on the similarly designated processing unit. Effectively, this influences the tasks by providing hard real-time capability. As additional operations are provided with deterministic implementations, fewer operations need be offloaded from real-time processing units. Accordingly, a single instance general purpose operating system with two or more virtual or actual processors may evolve into a system that supports hard real-time processing.

In addition, as shown in the illustrated example, processing steps of a task that are categorized are forwarded to a similarly categorized processing unit. Once a recipient non-hard real-time processing unit has completed executing a non-deterministic operation of the task, the results of the execution must be returned to the hard real-time processing unit. A shared data structure or a task descriptor may be employed to forward execution results. If the task descriptor does not contain all of the information needed for the hard real-time processing unit to be able to return execution results to the task that invoked the processing step, the task descriptor may be expanded to include space for this information.

Finally, Read-copy-update (RCU) is a mechanism that defers destruction of elements removed from a protected data structure, or a similar data organization element, until a concurrently executing read-only access to the data structure has completed an ongoing traversal of that data structure. Use of RCU in an operating system having a hard real-time processing unit can degrade hard real-time latency. One approach to resolve latency issues with RCU in the modified general purpose operating system is to have the hard real-time processing unit update a per-processing unit variable that indicates whether the associated processing unit is executing in user mode, an idle loop, or elsewhere in the kernel. The RCU processing that would normally execute on a scheduling clock interrupt of the hard real-time processing unit may instead execute from a timer or from a scheduling clock of another processing unit. The costs associated with this RCU processing is a modest increase in a cache miss rate, i.e. cache thrash, associated with invoking RCU callbacks on a different CPU. Accordingly, RCU processing is performed remotely to avoid impacting hard real-time scheduling requirements.

Advantages Over the Prior Art

The algorithm provided herein enables a single instance general purpose operating system to be configured or to evolve into a system that supports a hard real-time response with minimal modifications. Processing steps designated as hard real-time may be transferred from a non-hard real-time processing unit to a hard-real-time processing unit, and processing steps designated as non-hard real-time may be transferred from a hard-real-time processing unit to a non-hard real-time processing unit. As the status of tasks change or become upgraded, they may be appropriately transferred when deemed inappropriately assigned. Hard real-time tasks may specify that they are not to invoke a non-deterministic operation in order to maintain scheduling of hard real-time tasks. Similarly, hard real-time processing units may execute non-real-time tasks as long as there are no real-time tasks ready to execute and as long as the non-real-time tasks do not execute any non-deterministic operations.

Alternative Embodiments

It will be appreciated that, although specific embodiments of the invention have been described herein for purposes of illustration, various modifications may be made without departing from the spirit and scope of the invention. In particular, if a scheduler associated with a non-hard real-time processing unit is not sufficiently deterministic, the hard real-time processing unit should schedule processing steps from a special real-time queue dedicated to the hard real-time processing unit. Processing steps scheduled on other processing units that attain a hard real-time status may be transferred to a hard real-time processing unit as long as such a transfer does not cause the hard real-time processing unit to process the steps with non-hard real-time latencies. Similarly, if a processing step on a hard real-time processing unit loses real-time status, it may be transferred to a non-hard real-time processing unit as long as such a transfer does not cause the hard real-time processing unit to be exposed to non-hard real-time latencies. In addition, use of non-blocking synchronization, special queue manipulation instructions, and other procedures known to those skilled in the art may be used in place of locking in the shared data structure used to transfer processing steps to and from processing units in the operating system. For example, these alternative mechanisms may be required in cases where the hard real-time processing unit can lock out the non-hard real-time processing unit, such as when the hard real-time processing unit is a hardware thread with absolute priority over the non-hard real-time threads, or when the processing units are virtual units that are mapped onto a single physical processing chip. In addition, to track hard real-time response violations a flag may be provided with a hard real-time processing task that will issue an error should the task attempt to invoke non-hard real-time processing steps. Accordingly, the scope of protection of this invention is limited only by the following claims and their equivalents.

We claim:

1. A method for providing hard real-time services comprising:
    categorizing at least two processing units in a system with a single general purpose shared-memory operating system;
    designating at least one processing unit within said operating system as a hard real-time processing unit;
    designating at least one processing unit within said operating system as a non-hard real-time processing unit;
    forwarding a task from said hard real-time processing unit to said non-hard real-time processing unit upon determining that it is about to commence a non-deterministic operation; and
    returning said task to said real-time processing unit upon completion of the non-deterministic operation.

2. The method of claim 1, wherein the step of designating at least one processor within said operating system as a hard real-time processing unit includes dynamically assigning said hard real-time processing unit based upon running a real-time task on said processing unit.

3. The method of claim 1, wherein the step of categorizing at least two processing units in a single general purpose shared-memory operating system includes virtual and non-virtual processing units.

4. The method of claim 1, further comprising encoding said task with a processing step having a category selected from a group consisting of: a deterministic operation and a non-deterministic operation.

5. The method of claim 4, further comprising recognizing when said task is about to commence execution of a non-deterministic operation.

6. The method of claim 1, wherein said processing step is selected from a group consisting of: a system call, an interrupt, a trap, an exception, and a user mode execution.

7. The method of claim 1, further comprising remotely performing read-copy-update processing.

8. The method of claim 1, further comprising said real-time processing unit executing a real-time designated task.

9. The method of claim 1, further comprising determining said task is a real-time task that has been designated as non-forward able to said non-hard real-time processing unit, and flagging an error upon determining that said task is about to commence a non-real-time processing step.

10. A computer system comprising:
    at least two processing units in said system with a single general purpose shared-memory operating system;
    at least one of said processing units designated within said operating system as a hard real-time processing unit;
    at least one of said processing units designated within said operating system as a non-hard real-time processing unit;
    a manager adapted to forward a task from said hard real-time processing unit to said non-hard real-time processing unit in response to a determination that said task is about to commence a non-deterministic operation; and
    said manager adapted to return said task to said real-time processing unit upon completion of said non-deterministic operation.

11. The system of claim 10, further comprising a processing unit manager adapted to dynamically assign said hard real-time processing unit responsive to execution of a real-time task on said hard real-time processing unit.

12. The system of claim 10, wherein said processing units are selected from a group consisting of: a virtual processing unit and non-virtual processing unit.

13. The system of claim 10, further comprising a task manager adapted to encode said task with a processing step having a category selected from a group consisting of: a deterministic operation, and a non-deterministic operation.

14. The system of claim 13, wherein said task manager is adapted to recognize when said task is about to commence execution of a non-deterministic operation.

15. The system of claim 10, wherein said processing step is selected from a group consisting of: a system call, an interrupt, a trap, an exception, and a user mode execution.

16. The system of claim 10, further comprising a read-copy-update process adapted to be remotely performed.

17. The system of claim 10, wherein said real-time processing unit is adapted to execute a real-time designated task.

18. The system of claim 10, further comprising a task manager adapted to determine if said task is a real-time task that has been designated as non-forward able to said non-hard real-time processing unit, and flagging an error upon determining that said task is about to commence a non-deterministic operation.

19. An article comprising:
a computer readable data storage medium, the medium having instructions when executed by the processor, the instructions comprising;
instructions to categorize at least two processing units in a system with a single general purpose shared-memory operating system;
instructions to designate at least one of said processing units within said operating system as a hard real-time processing unit;
instructions to designate at least one of said processing units within said operating system as a non-hard real-time processing unit;
instructions to forward a task from said hard real-time processing unit to said non-hard real-time processing unit in response to a determination that said task is about to commence a non-deterministic operation; and
said task forwarding instructions to return said task to said real-time processing unit upon completion of said non-deterministic operation.

20. The article of claim 19, further comprising instructions to dynamically assign said hard real-time processing unit responsive to execution of a real-time task on said hard real-time processing unit.

21. The article of claim 19, wherein said processing units are selected from a group consisting of: a virtual processing unit and non-virtual processing unit.

22. The article of claim 19, further comprising instructions to encode said task with a processing step having a category selected from a group consisting of: a deterministic operation, and a non-deterministic operation.

23. The article of claim 22, wherein said task encoding means is adapted to recognize when said task is about to commence execution of a non-deterministic operation.

24. The article of claim 19 wherein said processing step is selected from a group consisting of: a system call, an interrupt, a trap, an exception, and a user mode execution.

25. The article of claim 19, further comprising instructions to remotely perform a read-copy-update process.

26. The article of claim 19, wherein said real-time processing unit is adapted to execute a real-time designated task.

27. The article of claim 19, further comprising instructions to determine if said task is a real-time task that has been designated as non-forward able to said non-hard real-time processing unit, and flagging an error upon determining that said task is about to commence a non-deterministic operation.

28. A single general purpose shared-memory operation system comprising:
at least two processing units functioning within said system;
at least one of said processing units designated as a hard real-time processing unit; at least one of said processing units designated as a non-hard real-time processing unit;
wherein a part of said operating system run by said hard real-time processing unit is algorithmically isolated from a part of said operating system run by said non-hard real-time processing unit; and
a task adapted to be forward from said hard real-time processing unit to said non-hard real-time processing unit in response to a determination that said task is about to commence a non-deterministic operation, wherein said task is adapted to be return to said hard real-time processing unit upon completion of said non-deterministic operation.

29. A computer system comprising:
at least two processing units in said system with a single general purpose shared-memory operating system;
at least one of said processing units designated within said operating system as a hard real-time processing unit, wherein a part of said operating system run by said hard real-time processing unit is algorithmically isolated from a part of said operating system run by said non-real-time processing unit;
at least one of said processing units designated within said operating system as a non-hard real-time processing unit;
means for forwarding a task from said hard real-time processing unit to said non-hard real-time processing unit in response to a determination that said task is about to commence a non-deterministic operation; and
means for returning said task to said real-time processing unit upon completion of said non-deterministic operation.

* * * * *